United States Patent [19]
Drnevich

[11] Patent Number: 5,241,816
[45] Date of Patent: Sep. 7, 1993

[54] GAS TURBINE STEAM ADDITION

[75] Inventor: Raymond F. Drnevich, Clarence Center, N.Y.

[73] Assignee: Praxair Technology, Inc., Danbury, Conn.

[21] Appl. No.: 805,091

[22] Filed: Dec. 9, 1991

[51] Int. Cl.$^5$ .............................. F02C 7/00; F02G 1/00
[52] U.S. Cl. .................... 60/39.53; 60/39.59; 48/197 R
[58] Field of Search ............... 60/39.05, 39.53, 39.55, 60/39.59; 48/197 R, 203; 252/373

[56] References Cited

U.S. PATENT DOCUMENTS

| | | | |
|---|---|---|---|
| 3,088,919 | 5/1963 | Brown, Jr. et al. | 252/373 |
| 3,091,593 | 5/1963 | Jean et al. | 252/373 |
| 3,785,146 | 1/1974 | Bailey et al. | 60/39.55 |
| 4,100,730 | 6/1978 | Pradt | 60/39.05 |
| 4,224,045 | 9/1980 | Olszewski et al. | 62/30 |
| 4,261,169 | 4/1981 | Zimmern | 60/39.05 |
| 4,418,527 | 12/1983 | Schlom et al. | 60/39.05 |
| 4,722,190 | 2/1988 | Yamamoto et al. | 60/39.05 |
| 4,785,622 | 11/1988 | Plumley et al. | 60/39.12 |
| 4,969,324 | 11/1990 | Woodson | 60/39.05 |

OTHER PUBLICATIONS

"Air Separation Integration for GCC Plants", R. R. Olson, Jr. et al, presented at EPRI Meeting, Oct. 17, 1991.

Primary Examiner—Richard A. Bertsch
Assistant Examiner—Howard R. Richman
Attorney, Agent, or Firm—Alvin H. Fritschler

[57] ABSTRACT

The output of gas turbines is enhanced by gas moisturization using a water contact tower and a pumped water recirculation loop with low pressure steam addition thereto.

3 Claims, 7 Drawing Sheets

GAS TURBINE STEAM ADDITION

BACKGROUND OF THE INVENTION

1. Field of the Invention

The invention relates to gas turbines. More particularly, it relates to enhancing the output of gas turbines.

2. Description of the Prior Art

Moisture is often added to gaseous fuels entering combustors as a means of $NO_x$ control. For this purpose, water vapor addition to gas streams is generally accomplished through the direct addition of steam to a gas stream. For gas turbine combustors, fuel gas is commonly injected therein, at pressures in excess of 200 psia, with said moderate pressure steam providing the moisture needed for $NO_x$ control. The direct addition of steam to the fuel gas serves to provide mass to the fuel gas, which has a beneficial effect on the net power output from the gas turbine, in addition to providing the moisture needed for $NO_x$ control.

In many instances, the steam employed for $NO_x$ control can be more efficiently used in a steam turbine, producing more power than can be obtained by expanding the steam in a gas turbine. For example, 1000 pounds per hour at 250 psia saturated steam fed to a condensing turbine can produce 112 hp, while feeding the same amount of steam to an industrial gas will produce about 90 hp, because of the lower applicable pressure ratio, and require additional fuel to raise the temperature of the steam to that needed for optimum gas turbine operation.

In an alternative approach for adding moisture to a gas stream, a hot water steam is added to the fuel gas by means of a water recirculation loop around a saturation tower from which fuel gas is injected into a gas turbine combustor. The water recirculation loop is heated by recovering heat from a hot fluid by means of a heat exchanger positioned in the loop. The hot water from the loop contacts the process gas stream, i.e., fuel gas, to be moisturized in the saturation tower, which is a packed tower or other device designed to bring the hot water and the process gas stream into intimate contact. In the saturation tower, the heat added in the heat exchanger is removed through vaporization of a portion of the water stream. The vaporized water leaves the top of the saturation tower with the process gas, while the cooled water leaves the bottom of the saturator. A portion of the recirculated water is periodically removed as blowdown to control salt concentrations, and makeup water is added to replace the water lost to the moisturized gas i.e., the fuel gas stream. In the use of such a technique, the fuel gas streams that are to be moisturized need to be located near a source of heat in order to avoid the need for long and expensive water recirculation loops.

While such approaches are useful for achieving a desired moisturizing of gas streams, there remains a desire in the art for further improvements. Thus, the moderate or high pressure steam used in one approach or the long water recirculation loops frequently required in the other, represent elements of expense that desirably should be reduced to achieve the ever-increasing overall requirements for practical gas turbine applications.

It is an object of the invention, therefore, to provide an improved apparatus for such gas turbine applications.

It is another object of the invention to provide an apparatus for more efficiently operating industrial gas turbines.

With these and other objects in mind, the invention is hereinafter described in detail, the novel features thereof bring particularly pointed out in the appended claims.

SUMMARY OF THE INVENTION

The output of gas turbines is enhanced using low pressure steam. A pumped water circuit and water contact tower are used to achieve desired gas moisturization using such low pressure steam.

BRIEF DESCRIPTION OF THE DRAWINGS

The invention is hereinafter described with reference to the accompanying drawings in which.

DETAILED DESCRIPTION OF THE INVENTION

The objects of the invention are accomplished by employing means to enhance the output of a gas turbine using low pressure steam, thereby enabling energy to be advantageously conserved. By the use of a pumped water circuit and a water contact tower, gas moisturization can be achieved using low pressure steam, both for gas turbine fuel and for waste nitrogen recycle associated with said integrated gas turbine (IGT) air separation systems.

In the practice of the invention, a water recirculation loop similar to that used in recovering heat from a hot process stream is employed. The heat required for moisturizing the process gas stream, e.g. fuel gas to a gas turbine, is provided either by direct injection of steam into the recirculation loop water or by heat exchange with steam. In either case, the steam will have a pressure only slightly above the partial pressure of water vapor in the moisturized gas stream.

The benefits derived from the invention are illustrated by consideration of a moderate pressure gas stream, e.g. 250 psia, desired to have a moisture content of 10%. For a stream of 500 lb. moles/hr. of dry gas at 250 psia, approximately 1,000 lb/hr of steam is needed to produce a gas mixture containing 10 mol of water vapor. If direct steam addition to said gas stream is employed, 250 psia is the minimum pressure of saturated steam that can be used to achieve the 10% moisture addition level. Alternatively, the 250 psia saturated steam could be used in a condensing steam turbine to practice 112 hp. By contrast, the invention enables the use of approximately 40 psia saturated steam to achieve the same moisture level of 10% in the 250 psia gas stream. The desirability of using 40 psia steam will be apparent since only about 73 hp can be generated per 1,000 lb/hr of steam at this pressure level. Consequently, for a highly efficient, intergrated steam system, the equivalent of 39 hp, or nearly 35% less useable energy, is required to moisturize the gas stream by use of the invention as compared to the requirements of direct steam addition to the gas stream.

Figure 1:
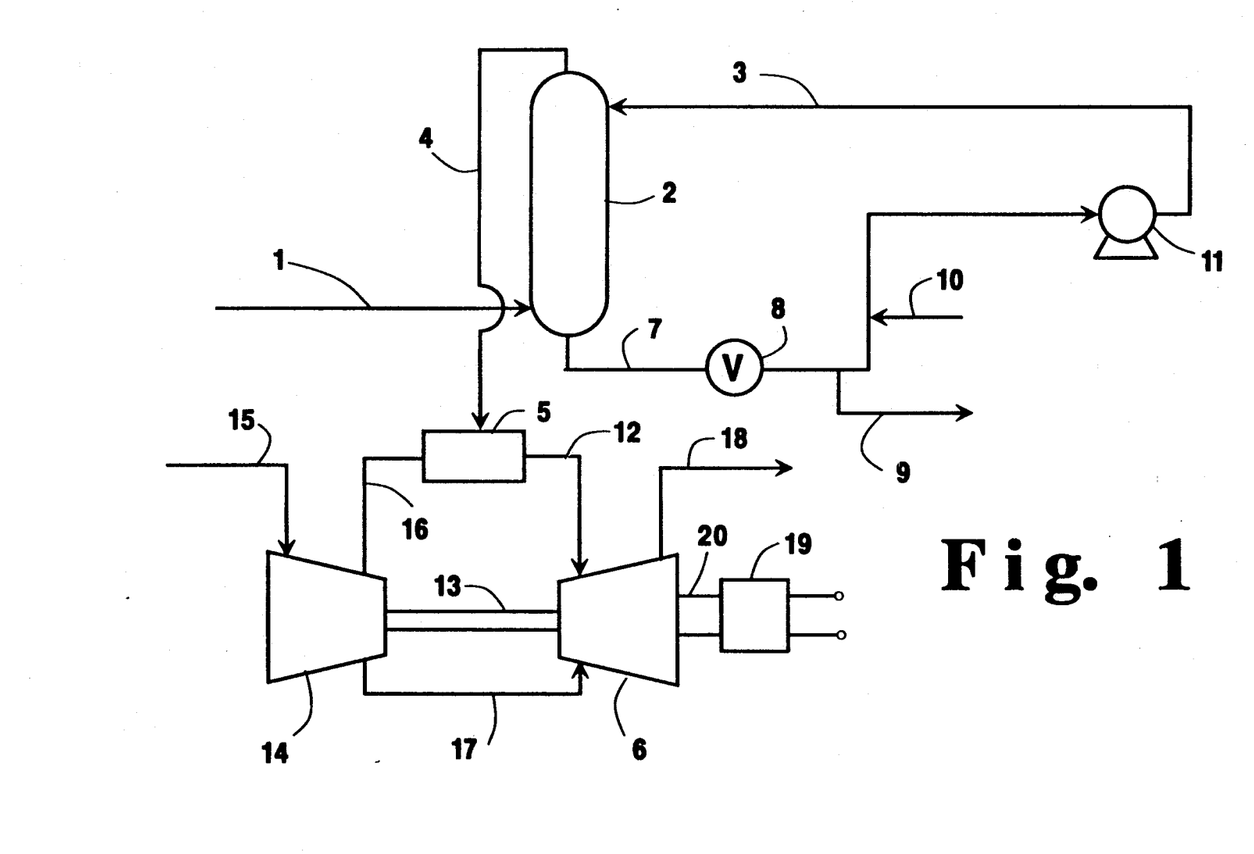
FIG. 1 is a process flow diagram of an embodiment of the invention for low pressure level addition of steam to a fuel gas.

With reference to FIG. 1 of the drawings, the low-level steam moisture addition of the invention is shown in conjunction with a gas turbine employed for electric power generation. In this illustrated embodiment, fuel for driving a combustion turbine is passed in line 1 to the bottom of saturation tower 2 in which it is heated and its moisture level is raised to 10% in countercurrent contact with hot water passing to the upper, vapor portion of said tower from recirculation line 3. The thus-treated fuel gas removed from the upper portion of tower 2 is passed in line 4 for burning in gas turbine combustor unit 5 to provide the energy to drive gas turbine 6. The somewhat cooler water removed from the bottom of said tower 2 in line 7 is throttled across valve 8 to a pressure sufficiently low to permit injection therein of low pressure steam. A small portion of the water flow in recirculation line 7 is removed through line 9 to control the buildup of harmful salts in the recirculation loop comprising said recirculation lines 3 and 7. Low-pressure steam for replacement purposes is added to recirculation line 7 from steam supply line 10. Such steam addition serves to raise the temperature of the water in the recirculation loop and provide the mass of water needed to sustain the moisturization operation. The hot water in recirculation line 7 downstream of the steam addition point is pumped by means of pump 11 at a pressure sufficiently high for delivery in line 3 to tower 2. Gas from gas turbine combustor 5 is passed in line 12 to gas turbine 6 connected by drive shaft 13 to air compressor 14 to which feed air is passed in line 15. A portion of the compressed air removed from air compressor 14 is passed in line 16 to said combustor 5, while the remaining portion of said compressed air is passed in line 17 to the inlet end of gas turbine 6. Exhaust gas from the gas turbine is removed in line 18. The power generated by gas expansion in said gas turbine is also used to generate electrical power in generator 19 driven by shaft 20 connected to said gas turbine 6.

Figure 2:
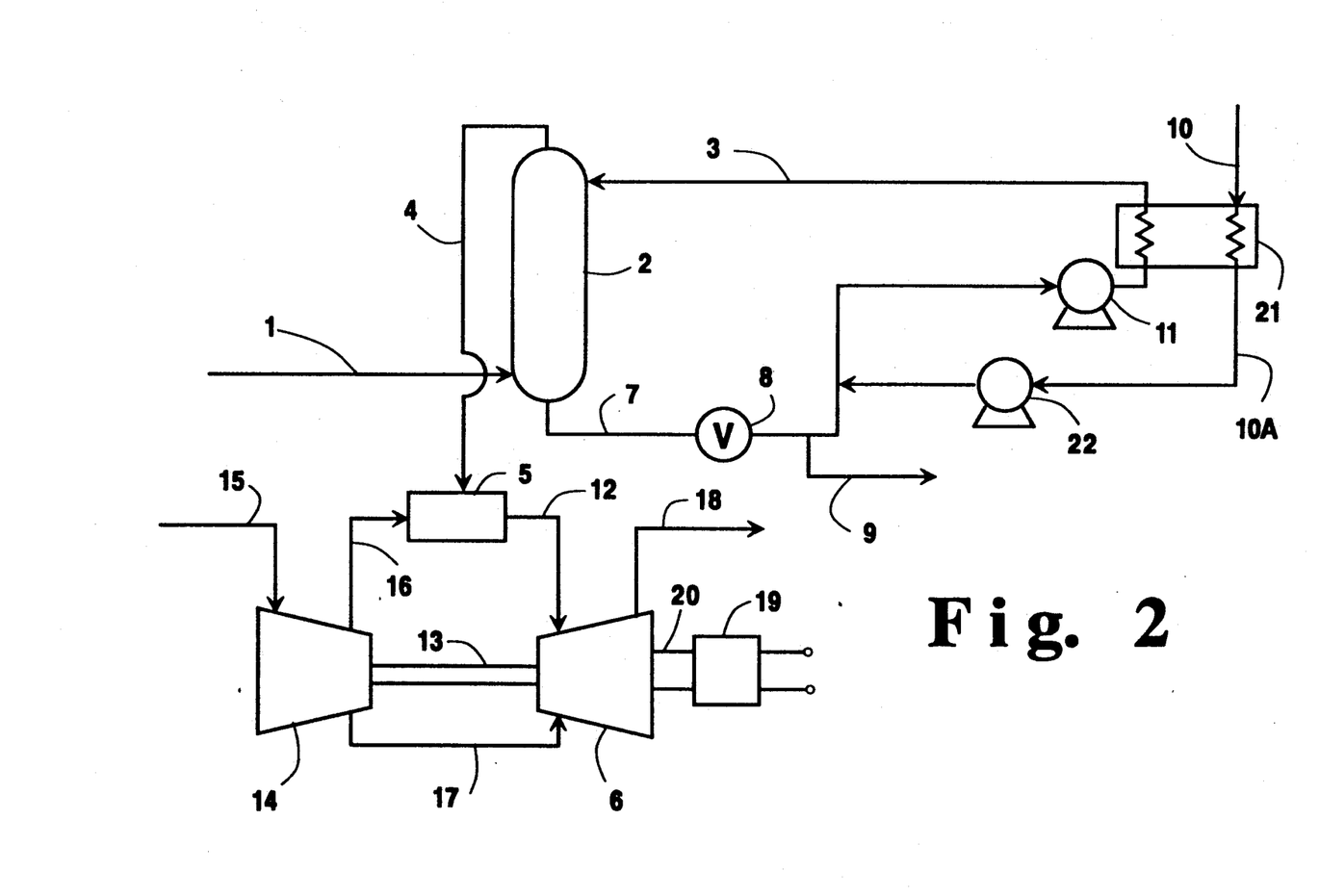
FIG. 2 is a process flow diagram of another embodiment of the invention illustrating said low pressure steam addition with heat exchange.

In the alternative embodiment of the invention shown in FIG. 2, the system as shown in FIG. 1 is employed with the desired heat of vaporization being supplied to the recirculating water by low-pressure steam across a heat exchanger rather than by direct injection. Thus, low-pressure steam in line 10 passes to heat exchanger 21, with the low-pressure condensate formed therein being pumped through line 10A, containing pump 22, for injection into line 7 of the water recirculation loop. Upon passing to pump 11, the water in said line 7 is heated in said heat exchanger 21 before being recycled in line 3 to saturation tower 2. In this embodiment, the water recirculation loop will be seen to perform as in the FIG. 1 embodiment except with respect to pump 11. Because there is no need to reduce the pressure on the recirculation loop to allow low-pressure steam injection therein, since said steam is condensed in heat exchanger 21, pump 11 is needed only to raise the pressure of the recirculating water in line 7 a small amount to overcome the pressure drop in the water recirculation loop. Consequently, the energy used by pump 11 will be much less in the FIG. 2 embodiment than in the FIG. 1 embodiment.

Figure 3:
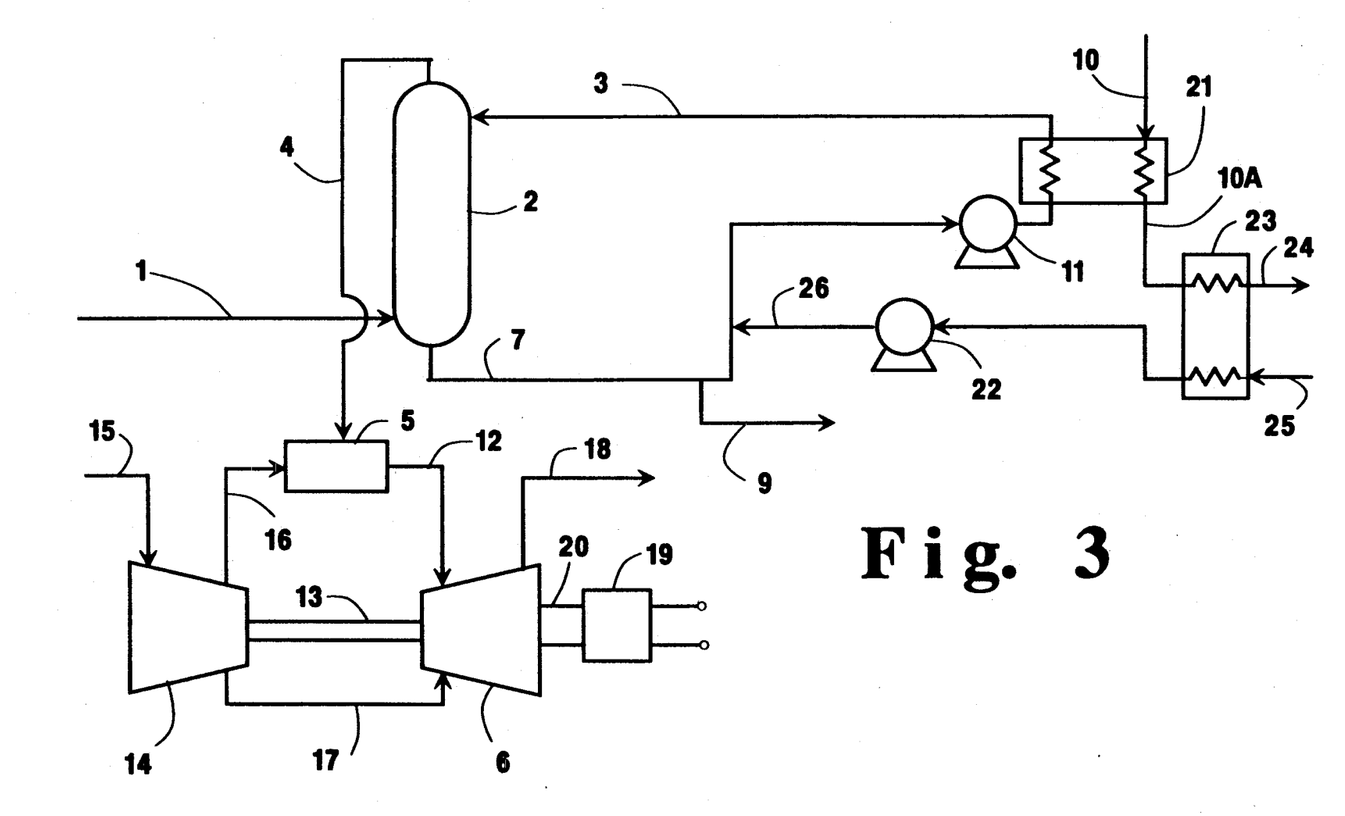
FIG. 3 is a process flow diagram of an embodiment of the invention in which low level steam moisture addition is achieved without steam/condensate injection.

In the FIG. 3 embodiment of the invention, low pressure steam provides the heat of vaporization through heat exchanger 21, as in the FIG. 2 embodiment, with the resulting condensate not being passed to the recirculation loop, but being employed to preheat makeup water prior to being returned to the low pressure steam generation system employed to generate the low pressure steam for the system. Thus, low pressure steam from line 10 is passed to heat exchanger 21 to heat water passed thereto through line 7 and pump 11. Low-pressure condensate is passed from heat exchanger 21 through line 10A to heat exchanger 23 from which it is passed in line 24 to said steam generation system, not shown. Makeup water is passed from line 25 to heat exchanger 23 for preheating prior to being passed in line 26, containing pump 22, for introduction into line 7 of the water recirculation loop, which performs as in the previous embodiments. The advantage of the FIG. 3 embodiment can be appreciated from a consideration of the relative quality of makeup water for the water recirculation loop and the steam generation system. Typically, deionized/deaerated water is used in steam generation systems to control scaling and corrosion in the steam generation boilers. Makeup water for the water recirculation loop can be any source of relatively clean water, such as cooling water. Cooling water requires substantially less treatment than boiler feed water, and the FIG. 3 embodiment enables water suitable for boiler feed purposes to be efficiently used therefor, with less costly cooling water or other such water being used for makeup purposes in the recirculation loop.

As indicated above, the invention can be used for moisturization of gas turbine fuel, as described above particularly with respect to the FIGS. 1-3 embodiments, or the waste nitrogen return associated with the integrated gas turbine (IGT) air separation system such as that shown in the Olszewski et al. patent, U.S. Pat. No. 4,224,045. In the IGT approach, air is extracted from a gas turbine compressor and passed to an air compressor and passed to an air separation plant. The waste nitrogen from said plant is compressed and returned to the gas turbine either before or after the gas turbine combustor unit. The air separation plant removes about 20% of the volume of said extracted air as product oxygen. As a result, the mass returning to the gas turbine as waste nitrogen is less than the mass of gas extracted from the gas turbine air compressor.

Figure 4:
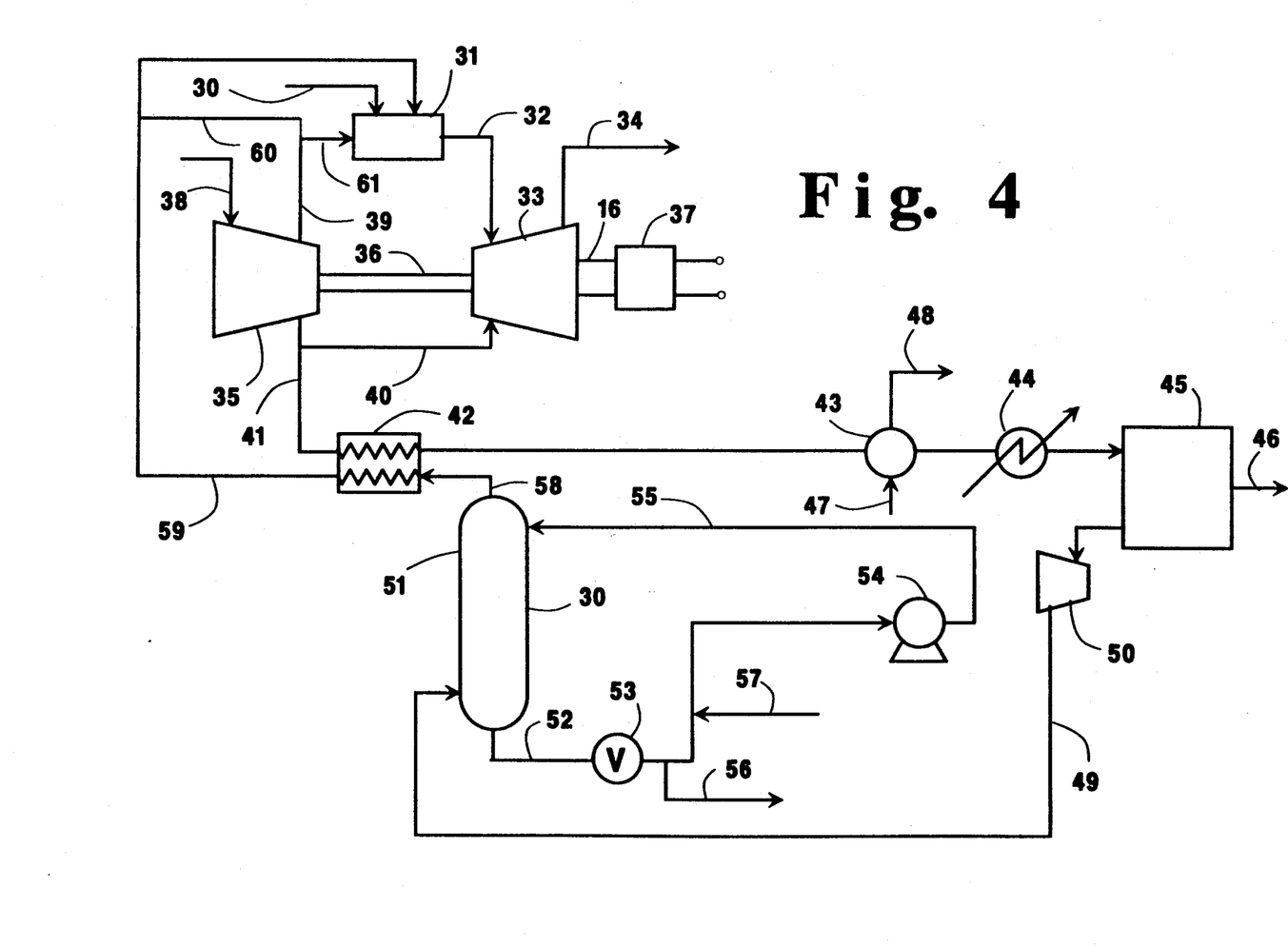
FIG. 4 is a process flow diagram of an embodiment of the invention in which moisture is added to a waste nitrogen recycle stream of an integrated gas turbine (IGT) air separation system.

In the FIG. 4 embodiment of the invention pertaining to the IGT approach, moisture is added to the waste nitrogen being recycled to the gas turbine through a water recirculation loop as to the fuel gas in the FIGS. 1-3 embodiments. Said waste nitrogen stream is returned to the gas turbine either upstream or downstream of the gas turbine combustor. All or a part of the mass removed from the system in the product gas withdrawn from the air separation system is replaced by moisture provided by low-pressure steam.

In the FIG. 4 embodiment, fuel gas is passed through line 30 to gas turbine combustor 31 from which gas is passed in line 32 to gas turbine 33 from which expanded exhaust gas is removed through line 34. Gas turbine 33 is connected by drive shaft 34 to air compressor 35 and by drive shaft 36 to electrical power generator 37. Feed air is passed to air compressor 35 in line 38. A portion of the compressed air from air compressor 35 is passed in line 39 to turbine combustor 31, while another portion thereof is passed in line 40 directly to gas turbine 33. The remaining portion of the compressed air passes in line 41, through heat exchanger 42 and coolers 43 and 44, to air separation system 45, from which a product oxygen stream is recovered through line 46. Said cooler 43 is conveniently operated against boiler feed water from line 47 and passing in line 48 to steam generation means. Cooler 44 is conveniently operated against a source of cooling water.

Waste nitrogen from the air separation system is recycled to the gas turbine system, with passage through a saturation tower with associated water recirculation loop as in the embodiments described above. Thus, waste nitrogen from air separation system 45 is passed in line 49 containing expander 50 to the bottom of saturation tower 51. Water is removed from the bottom of said tower 51 through recirculation line 52, containing throttling valve 53 for passage to pump 54 and recirculation line 55 for introduction at the upper portion of said saturation tower 51 for downward passage and countercurrent contact with waste nitrogen therein. As in the earlier embodiments, a small portion of the water flow in recirculation line 52 is removed through line 56 to control harmful salt buildup. Low-pressure steam for replacement purposes is added to recirculation line 52, downstream of valve 53, from steam supply line 57.

The thus-treated waste nitrogen stream is removed from the upper portion of tower 51 through line 58 and is heated against compressed air from air compressor 35 in heat exchanger 42 before passage to the gas turbine system. A portion of the cooled waste nitrogen stream exiting the heat exchanger is passed in line 59 directly to gas turbine combustor 31 for reaction therein. A portion of this waste nitrogen stream, in the illustrated embodiment, is passed in line 60 for combining with compressed air in line 39 and passage of said combined stream in line 61 to said combustor 31. In the practice of the invention, it will be understood that all of the recycled waste nitrogen can be passed to the combustor through either line 59 or line 61 above.

Figure 5:
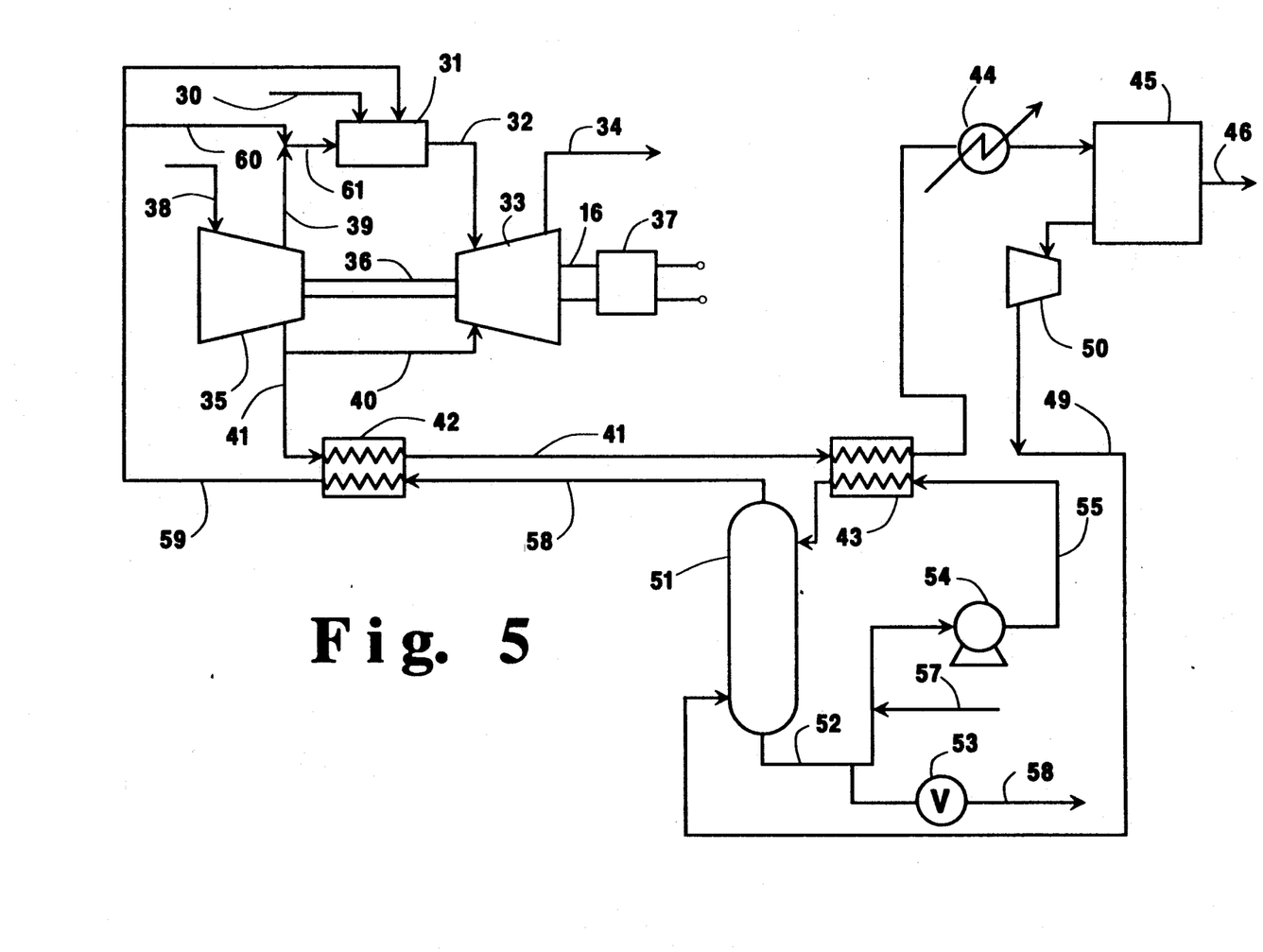
FIG. 5 is a process flow diagram of an embodiment of said IGT system with means for adding moisture to the waste nitrogen recycle stream.

In the FIG. 5 embodiment, a heat exchanger is used to provide heat to the water in the water recirculation loop from the compressed air passing to the air separation system. As a result, water, e.g., boiler feed water, can be introduced into recirculation line 52 from line 57, instead of low-pressure steam as in the FIG. 4 embodiment. The recirculating water stream in line 55 downstream of pump 54 is thus passed through heat exchanger 43 for heating against compressed air in line 41 before return to the top of saturation tower 51. The compressed air, upon further cooling in said heat exchanger 43, is passed through cooler 44 to air separation system 45.

Figure 6:
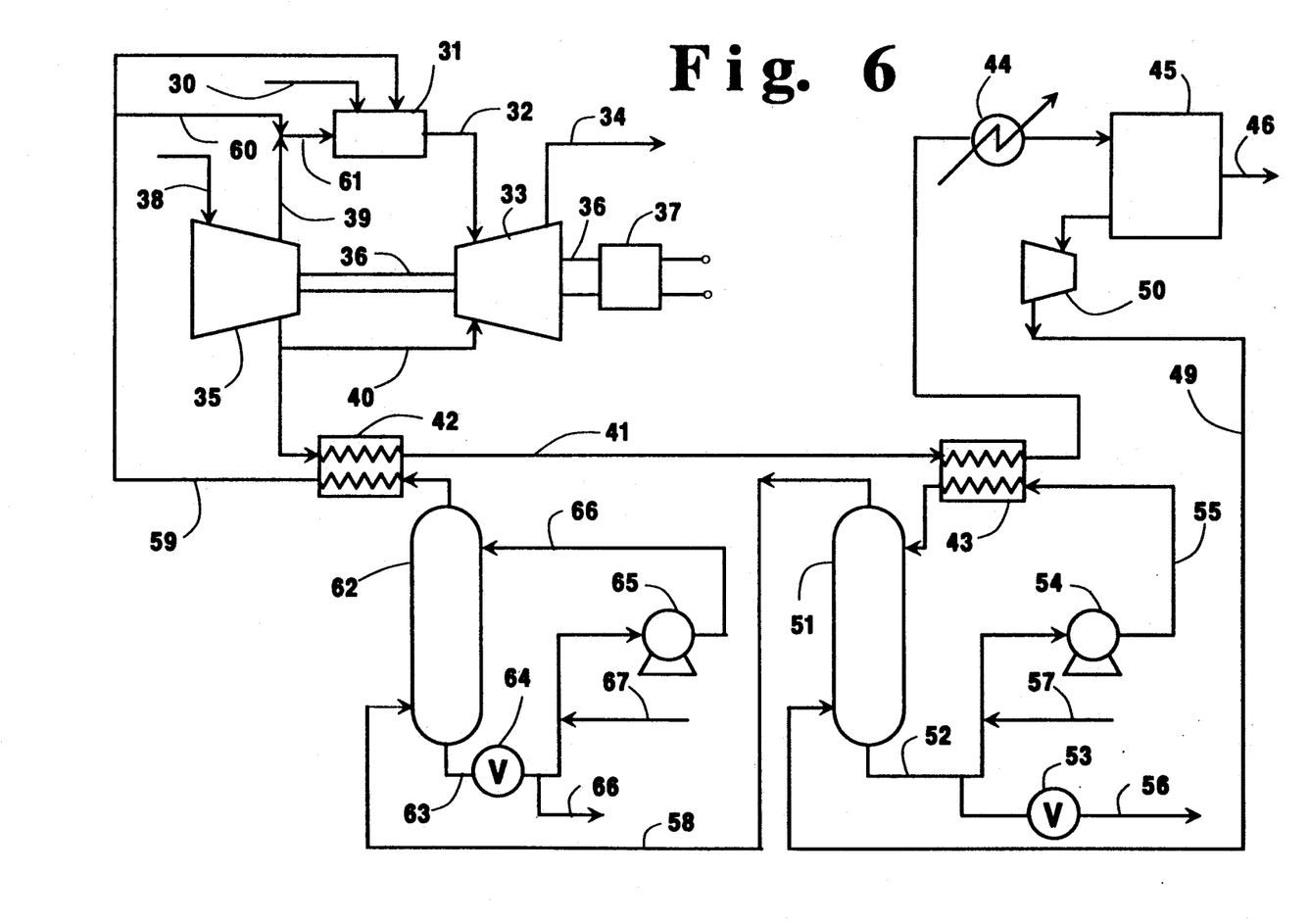
FIG. 6 is a process flow diagram of an embodiment of said IGT system with alternative means for moisture addition to said waste nitrogen recycle system.

FIG. 6 illustrates an alternative means for the desired moisture addition to the waste nitrogen stream being recycled from the air separation system to the gas turbine system. In this embodiment, two saturation towers and associated water recirculation loops are employed, with low pressure steam being added to one such loop and boiler feed water being added to the other. The FIG. 6 embodiment is numbered as in the FIG. 5 embodiment except that the waste nitrogen recycled from the top of saturation tower 51 in line 58 does not pass directly to heat exchanger 42 and to the gas turbine system, but is passed to a second saturation tower-water recirculation loop such as is illustrated in the FIG. 4 embodiment of the invention. Thus, waste nitrogen in line 58 passes to the bottom of saturation tower 62 from the top of which a moisturized waste nitrogen stream passes in line 59 to said heat exchanger 42. Water removed from the bottom of said tower 62 is passed in recirculation line 63 containing throttle valve 64 to pump 65, and from said pump through recirculation line 66 to the top of saturation tower 62. As in the other embodiments, a small portion of the water flow in recirculation line 63 is withdrawn through line 66, low-pressure steam is added to said recirculation line from steam supply line 67.

Figure 7:
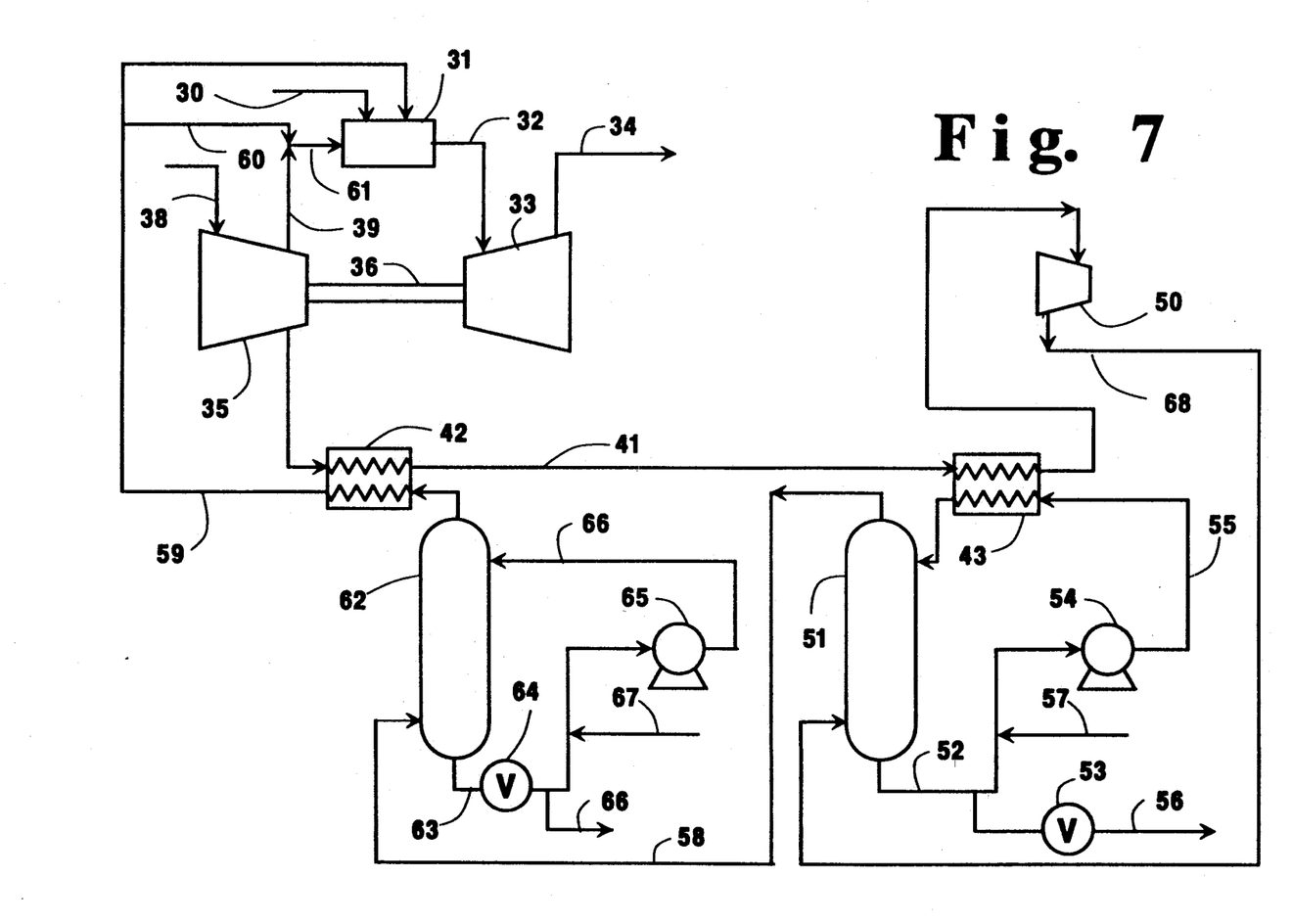
FIG. 7 is a process flow diagram of an alternative means for moisture addition to increase gas turbine capacity.

FIG. 7 is an alternative embodiment illustrating moisture addition to increase gas turbine capacity by means of combined moisture addition systems. This embodiment is the same as that of FIG. 6 except that the compressed air passing through heat exchanger 43 is passed directly to expander 50, rather than to air separation system 45 of the FIG. 6 embodiment, with the gas passing from expander 50 through line 49 being introduced into to saturation tower 51 as in the FIG. 6 embodiment.

Those skilled in the art will appreciate that variations can be made in the details of the invention as carried out in practice without departing from the scope of the invention as set forth in the appended claims. For purposes of the invention, low pressure steam addition to the water in the recirculation loop will be understood to be such addition at a pressure of from about 20 psia to about 100 psia, with a steam addition pressure of about 40 to about 50 psia being generally preferred. Waste nitrogen being recycled for reintroduction to the gas turbine is typically compressed to about 200 psia, although it will be appreciated that the particular pressure level employed for this purpose will depend upon the particular application, the operating characteristics of the gas turbine employed, and the like.

The invention is further illustrated by the five case example of the Table below. In this Table representing various IGT operating arrangements, the moisture addition feature is as follows:

Case 1 —represents a conventional IGT system in which no moisture is added to the waste nitrogen recycle stream;

Case 2 —represents an IGT system in which 250 psia steam is injected directly into the waste nitrogen recycle stream;

Case 3 —represents an IGT system operated in accordance with the FIG. 4 embodiment of the invention, with 50 psia steam being introduced into recirculation line 52;

Case 4 —represents an IGT system operated in accordance with the FIG. 5 embodiment of the invention, with boiler feed being introduced into recirculation line 52; and Case 5 —represents an IGT system operated in accordance with the FIG. 6 embodiment of the invention, with boiler feed water being introduced into recirculation line 52 and 50 psia steam being introduced into recirculation line 63.

TABLE

| Stream (lb mole/hr) | Case 1 | 2 | 3 | 4 | 5 |
|---|---|---|---|---|---|
| (a) compressed air (line 41) | 25,794 | 25,794 | 25,794 | 25,794 | 25,794 |
| (b) oxygen product (line 46) | 5,430 | 5,430 | 5,430 | 5,430 | 5,430 |
| (c) 50 psia steam addition | — | 5,767 | 5,767 | 0 | 3,787 |
| (d) waste nitrogen recycle to tower (line 49) | 20,144 | 20,144 | 20,144 | 20,144 | 20,144 |
| (e) waste nitrogen recycle to gas turbine (line 39) | 20,144 | 25,242 | 25,242 | 21,204 | 25,242 |
| Combined-Cycle Net Power (KW) | Base | Base + 14,100 | Base + 16,900 | Base + 12,100 | Base + 18,900 |
| Combined-Cycle Heat Rate (Btu/KWH) | Base | Base − 390 | Base − 557 | Base − 634 | Base − 668 |

As seen in the Table, the use of moderate pressure, 250 psia steam, i.e. Case 2, can increase the net power of the gas turbine by 14,100 KW when compared to IGT operation without moisture addition, i.e. Case 1. The mass replacement achieved using direct steam addition also allows the gas turbine to operate more efficiently.

Case 3 shows that, by the practice of the invention, an additional 2,800 KW of output improvement can be achieved as contrasted to said direct steam addition. Furthermore, heat rate improvements of 557 and 167 Btu/KWH are obtainable in the practice of the invention as compared to the base case, i.e. Case 1, and the direct steam addition case, i.e. Case 2, respectively.

Case 4, using boiler feed water (BFW) instead of 50 psia steam as in Case 3 for desired mass increase, utilizes low-level heat recovery to provide as much moisture as possible from heat obtained from the stream in line 41. The temperature level and heat content of the stream in line 41 limits the moisture content of the stream in line 59 to about 5% by volume. In this case, 12,100 KW of power is available over the base case. However, the equivalent of 670 KW of 12.5 psia steam would be required to replace the BFW heating lost by using the low level heat for moisturizing the gas. The heat rate for Case 4 shows an improvement of 634 Btu/KWH over the base case and of 244 Btu/KWH over Case 2 which uses 250 psia saturated steam.

In Case 5, which employs a combination of moisture addition methods that could be used to moisturize waste nitrogen return for IGT operations, the heat rejected to boiler feed water in the FIG. 4 embodiment of Case 3 is used to provide heat for partial moisturization of the waste nitrogen. Additional moisture is added using low-pressure steam. This embodiment reduces the quantity of low-pressure steam required for moisture addition by about 25%. Integration of the two water recycle loops would provide a substantial capital savings in that only one tower would be required.

As shown in the Table, the moisture addition approach of Case 5 results in an 18,900 KW increase in net power over IGT Case 1, without moisture addition, and a 4,700 KW increase over Case 2. The heat rate for the combined-cycle of Case 5 improved by 668 Btu/KWH over the IGT without moisture addition of Case 1 and by 278 Btu/KWH over the IGT with direct steam addition, i.e. Case 2.

The FIG. 7 embodiment illustrates the use of the low level steam for moisture addition in a system to increase the net output of a gas turbine. In this embodiment, the moisture is added to air to increase the mass throughout of gas turbine 33 without substantially increasing air compressor 35 power requirements. More moisture can be added to the gas turbine than can be added with the fuel because the addition of moisture to the fuel rapidly reduces its BTU content.

When the BTU content approaches about 150 Btu/scf, the fuel may no longer burn in the combustor. When moisture is added to compressed air stream 60, only about ⅓ of the moisture effectively impacts the BTU content of the fuel. About ⅔ of the air is used to cool the combustion products to the turbine inlet temperature. It should be noticed the FIG. 7 embodiment can also be effective without the need for employing expander 50.

It will be understood that various other combinations can be employed within the scope of the invention, using direct steam addition and/or recovering heat from hot process streams, for unique advantages in specific applications. The low pressure steam addition of the invention will be understood to comprise the addition of steam at pressures of from about 30 to about 75 psia, preferably from about 40 to 60 psia, conveniently about 50 psia, although low pressures outside such ranges can also be employed in the practice of the invention.

The invention will be seen to represent a significant advance in the field of gas turbine operations. The use of low pressure steam to enhance the output of a gas turbine advantageously enables desirable energy conservation to be achieved.

I claim:

1. An apparatus for the addition of low pressure steam to the fuel gas used to drive a gas turbine comprising:
   (a) a saturation tower adapted for the contacting of said fuel gas with a hot water stream for the moisturization of said fuel gas;
   (b) conduit means for passing fuel gas to the bottom portion of said saturation tower for upward passage therein;
   (c) conduit means for passing hot water to the upper portion of said saturation tower for downward passage therein;
   (d) conduit means for removing moisturized fuel gas from the upper portion of said saturation tower for burning in a gas turbine combustor unit to provide the energy to drive a gas turbine;

(e) conduit means for withdrawing water from the bottom portion of said saturation tower, said conduit means and the conduit means for passing hot water to the saturation tower being in fluid communication and forming a water recirculation loop around said saturation tower;

(f) pump means in the water recirculation loop for pumping said water therein for delivery to the saturation tower;

(g) valve means in said water recirculation loop upstream of said pump means for throttling the pressure of the water withdrawn from the saturation tower to a pressure such as to enable low pressure steam to be injected therein; and (h) steam supply conduit means for the addition of low pressure steam to the water recirculation loop at a point intermediate said pump means and said valve means; whereby moisturization of the fuel gas for a gas turbine is advantageously achieved using low pressure steam.

2. The apparatus of claim 1 and including conduit means for removing a portion of the water in said water recirculation loop.

3. An apparatus for the addition of low pressure steam to the fuel gas used to drive a gas turbine comprising:

(a) a saturation tower adapted for the contacting of said fuel gas with a hot water stream for the moisturization of said fuel gas;

(b) conduit means for passing fuel gas to the bottom portion of said saturation tower for upward passage therein;

(c) conduit means for passing hot water to the upper portion of said saturation tower for downward passage therein;

(d) conduit means for removing moisturized fuel gas from the upper portion of said saturation tower for burning in a gas turbine combustor unit to provide the energy to drive a gas turbine;

(e) conduit means for withdrawing water from the bottom portion of said saturation tower, said conduit means and the conduit means for passing hot water to the saturation tower being in fluid communication and forming a water recirculation loop around said saturation tower;

(f) pump means in the water recirculation loop for pumping said water therein for delivery to the saturation tower;

(g) valve means in said water recirculation loop upstream of said pump means for throttling the pressure of the water withdrawn from the saturation tower to a pressure such as to enable low pressure steam to be injected therein; and (h) heat exchange means positioned in said water recirculation loop downstream of said pump means, said heat exchange means adapted to heat the water in the water recirculation loop by means of said low pressure steam from steam supply conduit means, and pump means for pumping low-pressure condensate formed upon cooling of said low pressure steam to said water recirculation loop at a point intermediate said pump means and said valve means.

* * * * *